2 Sheets--Sheet 1.
J. V. MEIGS.
Breech-Loading Fire-Arms.
No. 5,433. Reissued June 3, 1873.
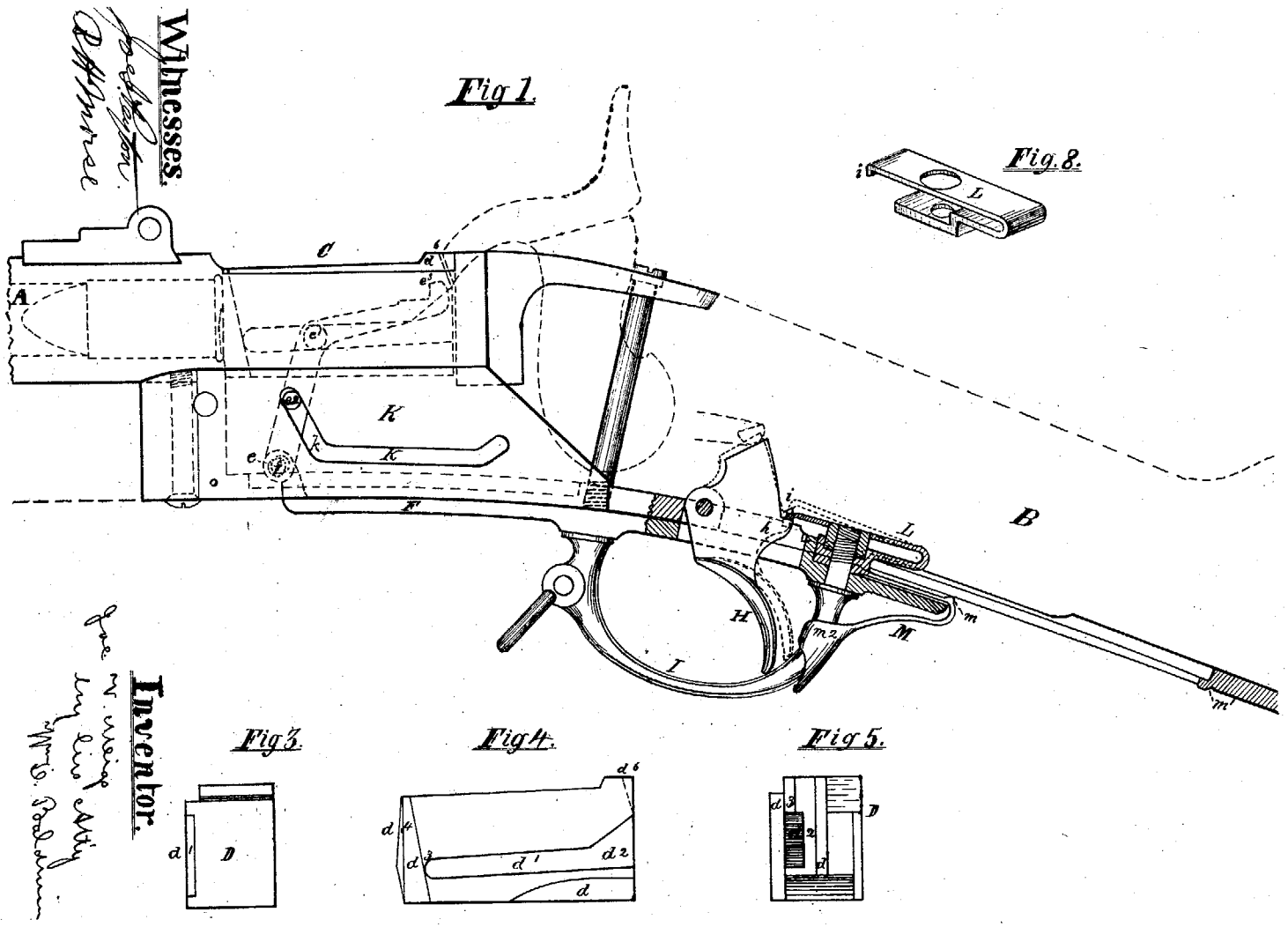
Witnesses.
Joe S. Layton.
R. H. Morse
Inventor.
Geo. V. Meigs
by his Att'y
Wm. E. Baldwin
AM. PHOTO-LITHOGRAPHIC CO. N.Y. (OSBORNE'S PROCESS.)

J. V. MEIGS.
Breech-Loading Fire-Arms.
No. 5,433. Reissued June 3, 1873.
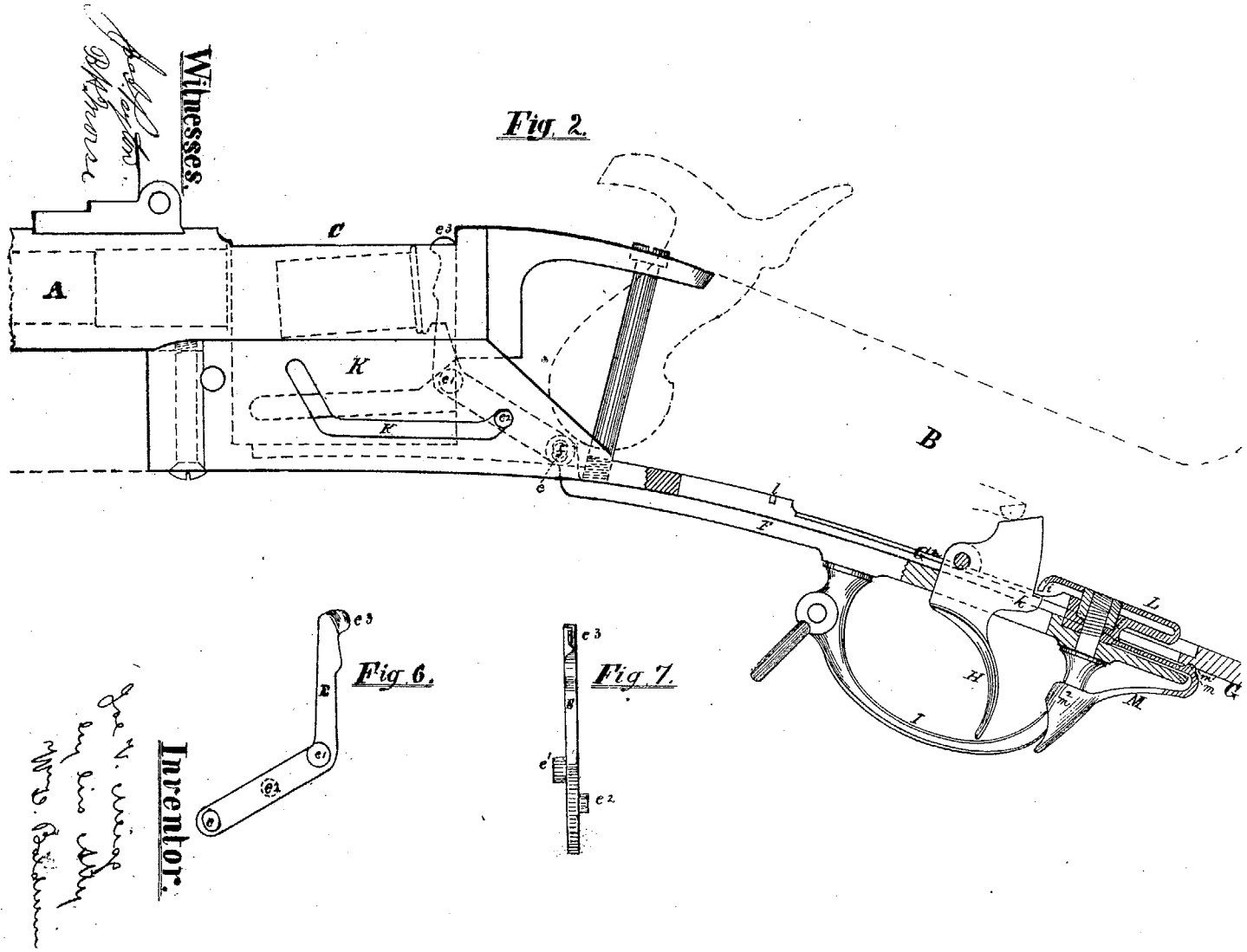
AM. PHOTO-LITHOGRAPHIC CO. N.Y. (OSBORNE'S PROCESS.)

UNITED STATES PATENT OFFICE.

JOE V. MEIGS, OF LOWELL, MASSACHUSETTS.

IMPROVEMENT IN BREECH-LOADING FIRE-ARMS.

Specification forming part of Letters Patent No. 81,100, dated August 18, 1868; antedated August 5, 1868; reissue No. 5,433, dated June 3, 1873; application filed March 31, 1873.

DIVISION A.

*To all whom it may concern:*

Be it known that I, JOE V. MEIGS, formerly of the city of Washington, in the District of Columbia, but now residing at Lowell, in the county of Middlesex and State of Massachusetts, have invented certain new and useful Improvements in Breech-Loading Fire-Arms, of which the following is a specification:

Letters Patent of the United States were granted to me May 22, 1866, for breech-loading fire-arms. My present invention constitutes an improvement on the invention described in the Letters Patent aforesaid, and its object is to increase the efficiency of the arm. The subject-matter claimed is particularly specified hereinafter.

In the accompanying drawings, which represent a Springfield muzzle-loading rifled musket converted into a breech-loader on my improved plan, Figure 1 represents a side elevation, partly in section, the portions inclosing the breech being shown as transparent, with the parts in the attitude they assume at the moment of firing. Fig. 2 represents a similar view, showing the breech open and the hammer at full-cock. Figs. 3, 4, and 5 represent, respectively, views of the front, the left side, and the rear of the breech-block. Figs. 6 and 7 represent, respectively, side and edge views of the retractor and inserter. Fig. 8 represents the locking spring-catch in perspective.

A barrel, A, is shown as secured in the usual way to a stock, D, the outlines of the latter being indicated by dotted lines. An oblong slot or mortise, C, is cut vertically through the barrel just in front of the breech-plug, being somewhat wider than the bore of the piece, and somewhat longer than the cartridge. A breech-block, D, fits loosely in this slot, and moves transversely to the bore of the piece, its movements being effected and controlled by a bent lever or link, E, pivoted at its lower end to the front end of a guard-plate, F, which slides in a longitudinally-slotted guide-plate, G, secured underneath the stock, and also carries a trigger, H, and trigger-guard I, in a manner resembling that set forth in my Letters Patent aforesaid. The breech-block D, Figs. 3, 4, and 5, has a recess, *d*, in its under side, near its rear end, in order that the pivot-pin *f* of the bent lever E may slide under it a short distance when the guard is first moved forward to close the breech, without moving the breech-block. A horizontal slot, $d^1$, with an upwardly-flaring mouth, $d^2$, is formed in the left side of the breech-block. The left side of the block is cut away in such manner as to leave a vertical flange, $d^3$, on its left front corner, and a long vertical opening between the left side of the breech-block and the wall of the breech, in which opening the bent lever E plays. The breech-block, as before remarked, plays loosely in the slot of a breech; a projection, $d^4$, on its right-hand side serves as a firing-pin, as hereinafter explained. This breech-block is moved up and down by the bent lever E, having a guide-pin, $e^1$ $e^2$, on each side. (See Fig. 7.) A pin, *f*, on the sliding guard F enters an eccentric hole, *e*, on the bent lever E, thus pin-jointing the two together, and allowing the bent lever a slight degree of play on the pin. The outer pin $e^2$ on the bent lever moves in a slot, *k*, in a plate, K, secured to the guard-plate G, while the inner pin $e^1$ traverses the groove $d^1$ in the breech-block. A hook, $e^3$, on the upper end of this bent lever, serves to extract the cartridge, as hereinafter explained. A catch, *i*, on a locking-spring, L, takes into a notch, *l*, on the guard-plate G when the guard F is shoved forward, and holds the breech-block securely in place at the moment of the explosion. A projection, *h*, on the trigger H releases the spring from the notch, and leaves the guard free to retract. The same result may be obtained by a spring-catch, M, arranged beneath the guard-plate G at the back of the guard, so as to slide with it. A projection or corner, *m*, on the back of the spring-catch engages with a corresponding notch, $m^1$, in the under side of the guard-plate. A clasp, $m^2$, on this spring-catch embraces the back of the trigger-guard and strengthens the catch, which is released by pressing forward with the fingers, which naturally rest behind the guard in firing.

The construction of the Springfield musket being well understood, a detailed description of the other parts of the gun is unnecessary.

In operation the parts of my gun, at the moment of firing, assume the relative position shown in Fig. 1. The pulling of the trigger releases the holding-catch L from the guide-plate G, thus leaving the guard I free to retract. The breech-block D, it will be observed, at the moment of firing, occupies a position in the slot C, in line with the bore of the barrel, in which position it is upheld by the pin $e^1$; consequently, as the force of the explosion is exerted in the direction of the length of the slot $d^1$, the force of the explosion is exerted on the breech-plug and its rear abutment instead of on the supporting-pin, thus avoiding the liability of breaking the pin.

The breech is opened by retracting the guard I; as this movement progresses the pivot-pin $f$, connecting the guard-plate F and the bent lever E, moves backward with the guard-plate, in a line nearly parallel with the bore; the outer pin $e^2$ on the bent lever slides backward down the front inclined portion of the slot $k$ in the plate K, while the inner pin $e^1$ of the bent lever slides forward in the groove $d^1$ of the breech-block. The result of these movements is that the hook $e^3$ of the bent lever is thrown forward, and as the breech-block D is drawn down by the pin $e^1$ hooks over the flange of the exploded cartridge-shell, a slight groove being cut in one side of the barrel for that purpose. At the moment this hook catches the flange, the pin $e^2$ passes from the inclined to the horizontal part of the slot $k$, and the lower part of the bent lever E becomes nearly horizontal. The continued retraction of the guard causes the hook $e^3$ to extract the exploded cartridge-shell so quickly that it impinges sharply against a projection, $d^6$, on the upper rear end of the breech-block, and is thrown out of the slot C. The back end of the slot $k$ inclines upward slightly. The continued backward movement of the guard causes the pin $e^2$ to rise in this slot, thus elevating the hook end of the bent lever E, simultaneously with which movement the pin $e^1$ moves into the flaring portion $d^2$ of the slot $d^1$ in the breech-block, which allows the latter to descend to its lowest point and the bent lever to assume the attitude shown in Fig. 2. The bent lever, it will be observed, has three fulcrums, $e^1$, $e^2$, and $f$, all movable—namely, one, $f$, in the sliding guard-plate, one, $e^2$, in the slot $k$ of the fixed plate K, and one, $e^1$, in the slot $d^1$ of the breech-block—by which construction both the breech-block and bent lever or extractor are actuated by the simple sliding of the guard-plate G in its guides. When the parts assume the relation shown in Fig. 2 the gun is ready for reloading. The hammer should, however, be down instead of up, as in that figure.

To load the gun a cartridge is dropped into the slot C, resting loosely on the breech-block. The relation of the pin and slots above mentioned is such that as the guard is shoved forward the hook $e^3$ of the bent lever moves slightly downward, and then advances horizontally nearly the entire length of the breech-block, thus shoving the cartridge into the chamber of the gun before the breech-block begins to rise. As soon as the cartridge is properly inserted the pin $e^2$ begins to ascend the front inclined portion of the slot $k$. The pivot-pin $f$ moves forward in its socket $e$, pressing on its front side, thus lifting the hook $e^3$ of the bent lever E (taking advantage of the curvature of the flange of the cartridge-shell) over its edge, allowing the bent lever to move forward so that its face shall come to the line of the end of the barrel, where it comes in contact with the projection $d^3$ on the breech-block, which prevents the bent lever from jamming upon the head of the shell, and the breech-block is quickly thrown into line with the bore, the hooked end of the bent lever rising and moving backward at the same time into the position shown in Fig. 1, where its pin $e^1$ holds the breech-block in place, and the bent lever is out of the way and free from the strain of the explosion, as the pin merely upholds the breech-block. The gun can thus be cocked and fired in the usual way, the operations above described being repeated at each fire.

My invention admits of the adaptation of a firing-pin for either a rim-fire or center-fire cartridge. I have, however, in this instance, made the breech-block itself the firing-pin. The breech-block, when the breech is closed, does not quite touch the hammer, and so fits in the slot C that in case of a rupture of the shell the walls of the slot will resist the force of the explosion, while the gases escape above and below the breech-block, thus preventing the bursting of the breech from this cause. A projection, $d^4$, on the front of the breech-block bears against the primed flange of the cartridge when the breech is closed. I have demonstrated by experiment that while there is no perceptible play of the breech-block in its slot, yet the hammer, when sprung, strikes the block with force sufficient with certainty to explode the charge, by which discovery I am able to dispense with any firing-pin other than the breech-block itself.

Should the hook $e^3$ fail at first to extract the exploded cartridge-shell by tearing through its flanged rim, the extracting movement can be repeated by sliding the guard forward until the hook does catch the shell. Its peculiar mode of striking forward and over the flange of the shell, on one side of its axis, tends to rotate the shell in the chamber, and thus present a new edge upon which the hook may act—an obvious advantage, possessed by no other extractor with which I am familiar.

From the foregoing description it will be seen that I have secured an efficient breech-loader by the combination of three simple instrumentalities, viz., a sliding guard, a sliding breech-block, and a bent lever or link connecting the two. This bent lever E, it will be observed, serves to insert the loaded cartridge and to expel its exploded shell, besides acting as a link to connect the sliding guard and breech-block.

An extractor controlled in its movements by a slot and guide-pin, as in the gun hereinbefore described, is simple in construction and sure and efficient in operation, being always positively operated and controlled.

I claim—

1. A breech-block moving loosely in a slot transverse to the bore of the gun, and constituting the firing-pin, substantially as set forth.

2. The combination of a breech-block, slotted horizontally and moving transversely to the line of the bore, with a lever vibrating on a pin movable in the slot of the breech-block, to hold the breech securely closed without strain on the lever, substantially as set forth.

3. The combination, substantially as set forth, of an extractor, a guide-pin, and a guide-slot in which the pin moves.

4. A cartridge inserting and extracting lever, working on three pivots, all movable, substantially as set forth.

5. The combination of a reciprocating trigger-guard, a slotted breech-block reciprocating transversely to the bore of the gun, and a vibrating lever pivoted to the guard, controlled by a guide-slot on the frame and actuating the breech-block by means of a sliding connection, these instrumentalities being constructed to operate in combination substantially as set forth.

6. An extractor vibrating on a movable fulcrum parallel to the line of the bore to push in the loaded cartridge as the breech closes, and hooking over the flange of the cartridge on one side of its axis to remove the exploded shell as the breech opens, substantially as set forth.

JOE V. MEIGS.

Witnesses:
JOE I. PEYTON,
E. C. DAVIDSON.